United States Patent [19]

Lindberg

[11] 4,414,932
[45] Nov. 15, 1983

[54] METHOD AND APPARATUS FOR HEAT STORAGE IN INTERNAL COMBUSTION ENGINES

[75] Inventor: John E. Lindberg, Point Richmond, Calif.

[73] Assignee: Owen, Wickersham & Erickson, San Francisco, Calif.

[21] Appl. No.: 315,943

[22] Filed: Oct. 28, 1981

Related U.S. Application Data

[60] Continuation-in-part of Ser. No. 190,932, Sep. 25, 1980, Pat. No. 4,393,817, and a continuation-in-part of Ser. No. 190,933, Sep. 25, 1980, abandoned, said Ser. No. 190,932, is a division of Ser. No. 657,747, Feb. 13, 1976, abandoned, said Ser. No. 190,933, is a continuation of Ser. No. 657,747, Feb. 13, 1976, abandoned, which is a continuation-in-part of Ser. No. 613,867, Sep. 16, 1975, abandoned, which is a continuation-in-part of Ser. No. 356,589, May 3, 1973, abandoned, which is a continuation-in-part of Ser. No. 227,440, Feb. 18, 1972, abandoned.

[51] Int. Cl.³ .............................................. F02M 31/00
[52] U.S. Cl. .......................... 123/142.5 R; 123/41.14; 123/543; 123/547; 123/553
[58] Field of Search .................. 165/104.11 A, 51; 123/41.14, 41.42, 142.5 R, 142.5 E, 553, 543, 547

[56] References Cited

U.S. PATENT DOCUMENTS

| 1,338,527 | 4/1920  | Reichel ............................. 123/543 |
| 1,437,395 | 12/1922 | Brush ................................ 123/547 |
| 1,634,394 | 7/1927  | Bernard .......................... 123/41.14 |
| 1,892,571 | 12/1932 | Goodwin ........................ 123/41.14 |
| 2,576,757 | 11/1951 | Heymann ................... 165/104.11 A |
| 2,766,974 | 10/1956 | McConnell ....................... 123/553 |
| 3,963,012 | 6/1976  | Harned .............................. 123/553 |
| 3,977,378 | 8/1976  | Harned .............................. 123/553 |
| 4,147,144 | 4/1979  | Furucz .............................. 123/543 |

FOREIGN PATENT DOCUMENTS 53-25713 3/1978 Japan .................................. 123/553

*Primary Examiner*—Wendell E. Burns
*Attorney, Agent, or Firm*—Owen, Wickersham & Erickson

[57] ABSTRACT

Exhaust emissions are reduced, fuel consumption is improved for internal-combustion engines, and the number of cold starts reduced by storing heat energy from the operation of the engine in a heat-storage reservoir filled with a change-of-state heat-storage material. Absorbed heat energy is released back to the engine's intake manifold to maintain elevated engine temperature between uses and starting up of the engine.

40 Claims, 12 Drawing Figures

METHOD AND APPARATUS FOR HEAT STORAGE IN INTERNAL COMBUSTION ENGINES

CROSS-REFERENCE TO RELATED APPLICATIONS

This application is a continuation-in-part of applications Ser. Nos. 190,932 now U.S. Pat. No. 4,393,817 and 190,933, now abandoned both filed Sept. 25, 1980, which are, respectively, a division and a continuation of Ser. No. 657,747 filed Feb. 13, 1976, now abandoned, which was a continuation-in-part of application Ser. No. 613,867, filed Sept. 16, 1975, now abandoned, which was a continuation-in-part of application Ser. No. 356,589 filed May 3, 1973, now abandoned, which was a continuation-in-part of application Ser. No. 227,440, filed Feb. 18, 1972, now abandoned. Application Ser. No. 227,440 is not relied on under 35 U.S.C. §120 because it does not disclose the invention claimed in the present application.

BACKGROUND OF THE INVENTION

This invention relates to internal-combustion engines, specifically to method and apparatus for improving the fuel efficiency of automobile engines and reducing their emissions during "cold start".

Under typical "cold start" conditions, an internal-combustion engine requires a rich fuel-air mixture. The carburetor chokes off some of the air being fed to the intake manifold in order to achieve this. When such a rich mixture is being used, the fuel consumption of the engine is dramatically increased, also raising the level of exhaust emissions. As the engine warms, the carburetor gradually leans out the fuel-air mixture until the engine reaches its normal operating or cycle temperature, at which time fuel efficiency is maximized and exhaust emissions are minimized, assuming normal load conditions. In summary, when an automobile is first started in the morning, or is re-started during the day after having not been used for a period of time, the engine will use up more fuel and at the same time produce increased exhaust emissions.

The typical driver of an automobile will use the vehicle for a number of short trips during the day. Usually, enough time elapses between these trips for the motor to cool down significantly from operating temperature. Therefore, most automobiles are operated most of the time during their least efficient period, namely during "cold start", when the engine temperature is being raised to operating temperature. Estimates made by the Environmental Protection Agency indicate that more than 30 percent of the United States' total fuel consumption occurs during the "cold start" period.

"Cold start" time may be decreased and engine efficiency increased by maintaining an elevated engine temperature, particularly at the intake manifold, between such uses. The closer that temperature is to normal operating temperature, the more efficient the engine will be.

Heretofore, the "cold start" problem in the automobile industry has been made worse by the quick loss of heat from internal combustion engines between uses. Various devices have been proposed for maintaining engine warmth during extremely cold weather, but these devices were not addressed to the problem of engine cooling between relatively consecutive uses. For example, the U.S. Pat. No. 1,338,750 to Schranck and Kunkel employs a heat exchanger on the exhaust pipe of an internal-combustion engine. The heat exchanger contains a block of soapstone which absorbs heat and transfers it to a water cavity connected to the cooling system of the engine, all for the purpose of keeping the engine coolant from freezing in cold weather. The warmed coolant flows by gravity feed. Electrically operated warming is also disclosed. The system is designed to be detachable so that it need not be used in the summer. The Schranck and Kunkel system does not address the "cold start" problems solved by the present invention.

The U.S. patent to Snelling (U.S. Pat. No. 3,114,360) shows a remotely located heat-storage reservoir filled with a fusible salt which is used to store heat from an external source, such as a blow torch. The melted salt or fused material transfers heat to a fluid which evaporates and is then pumped to some portion of the engine which requires additional heat due to its own heat loss, for example, the carburetor casing. The vaporized fluid gives up its heat, condenses, and returns to the remote reservoir. One embodiment suggest the use of heat from an exhaust pipe heat exchanger or from electrical means. This device does not, however, store heat directly from and return it to the engine part needing it, such as the intake manifold, nor is any part continuously heated and ready for instant starting.

Boehmfeld (U.S. Pat. No. 3,498,539) and Prebil (U.S. Pat. No. 3,853,270) both show heat-preserving tanks for maintaining a warmed volume of coolant fluid to be supplied to the cooling system when the engine is started. Neither of these shows direct absorption from, nor warming of the engine parts which can improve "cold start" and reduce pollution, namely the intake manifold and the carburetor.

It is therefore desirable to enable the storage of heat energy produced by an internal-combustion engine during operation, for use in maintaining the engine, particularly its intake manifold and carburetor, at an elevated temperature for a substantial period of time between uses.

An object of the invention is the storage of waste heat from an internal-combustion engine and subsequent release of that heat back to the engine, keeping it warm after shut-down.

Another object of the invention is to provide a method of improving fuel efficiency and reducing the emission of pollutants in an automobile during cold starting.

Yet another object of the invention is to provide a method and apparatus for directly increasing the cold-starting temperature of an internal-combustion engine, without use of additional energy for providing such additional heat.

Still another object of the invention is to provide a heat storage reservoir for heat exchange with the intake manifold of an internal-combustion engine, whereby waste heat from the intake manifold is stored during engine operation and is released to the manifold when the engine is shut down.

A further object of the invention is to provide an exothermic reaction chamber in heat exchange relationship with the intake manifold and carburetor of an internal-combustion engine.

A still further object of the invention is to provide apparatus for storing the exhaust manifold heat of an internal-combustion engine and to redistribute that heat to warm the intake manifold and carburetor of the engine after it has been shut down.

Another object of the invention is the provision of a heat-storage bladder which can be placed atop the intake manifold, carburetor, and air filter assembly of an internal-combustion engine for storing heat energy therefrom.

Yet another object of the invention is to provide an improved intake manifold for an internal-combustion engine having a unitary heat-storage chamber or chambers for maintaining elevated manifold temperature after engine shut-down.

Yet another object of the invention is the use of heat energy stored in a change-of-state material to maintain an elevated shut-down temperature for an internal-combustion engine.

These and other objects, advantages and features of my invention will become apparent from the following detailed description of preferred embodiments taken with the accompanying drawings.

SUMMARY OF THE INVENTION

The invention provides a method and apparatus for improving combustion and exhaust emissions in an internal-combustion engine having an intake manifold, an air filter assembly, a carburetor or fuel injection system, and an exhaust manifold. The apparatus includes a heat-storage reservoir in heat-exchange relationship with the intake manifold and a heat-storage medium disposed in the heat-storage reservoir. Engine heat from operation of the engine is transferred from the intake manifold to the heat-storage medium by indirect heat exchange through the reservoir. When the engine is shut down, and begins to cool, the stored heat is transferred back to the intake manifold from the heat-storage medium in the reservoir, thereby maintaining an elevated intake manifold temperature for start-up. The preferred heat-storage medium is a change-of-state material having a melting point below the normal operating temperature of the engine.

The reservoir may be a bladder adapted to fit over the top of the engine, covering all but the inlet of the air filter assembly and extending over the outer portions of the intake manifold. In another type of bladder configuration, a dual-chambered bladder is employed, wherein a lower chamber is filled with change-of-state heat-storage material. This lower chamber is in heat-exchange contact with the air filter assembly and the intake manifold. An upper bladder chamber covers the lower chamber and is filled with either water or with a change-of-state heat-storage material.

Another form of reservoir is an additional chamber constructed as a unit with the intake manifold, wherein the chamber is filled with heat-storage material for direct heat exchange with the intake manifold.

A separate chamber may be constructed atop the intake manifold and surrounding the carburetor, but below the air filter assembly. This also may be filled with a change-of-state heat-storage material. In another embodiment, a similar chamber is constructed having two sections. The lower chamber is filled with a first substance which is itself saturated with a second substance that reacts exothermically when mixed with the first substance. The two sections are connected at two points: by a check valve permitting flow of the second substance's vapor to the upper section, and by a controllable valve centrally disposed between the two chambers. In this embodiment, when the engine temperature has risen to normal operating temperature, the second substance vaporizes and passes through the check valve; it is separated from the first substance by being kept in the upper section. When the engine has cooled down and is to be restarted, the controllable valve is opened, enabling the now-cooled and condensed second substance to mix with the first substance to cause an exothermic reaction, thereby providing warmth to the intake manifold of the engine.

Another embodiment of the invention provides heat-storage bags which have an aluminized reflective top surface and insulating cover, a flexible casing, and a lower surface which permits heat exchange. The bags are filled with a change-of-state heat-storage material. These bags are adapted to be laid on top of the intake manifold for heat exchange with it.

In another embodiment, a heat exchanger is placed in contact with the exhaust manifold of the engine. A heating coil containing a heat-storage material is run from the heat exchanger up to and around the inside of a bladder-type reservoir and from there back to the heat exchanger. By employing this apparatus, the elevated temperature of the exhaust manifold is used to transfer heat to the heat-storage material inside the heating coil. This heat-storage material preferably has a vaporization point lower than the operating temperature of the exhaust manifold. A control valve, a thermostat, and an expansion chamber may also be used here to relieve pressure and to control the heating coil.

Preferred change-of-state heat-storage materials include paraffins such as pentacosane, tritiacontane, and camphene, and certain magnesium salts, namely, magnesium nitrate hexahydrate and an eutectic mixture thereof with magnesium chloride hexahydrate.

DETAILED DESCRIPTION OF THE PREFERRED EMBODIMENTS

Figure 1:
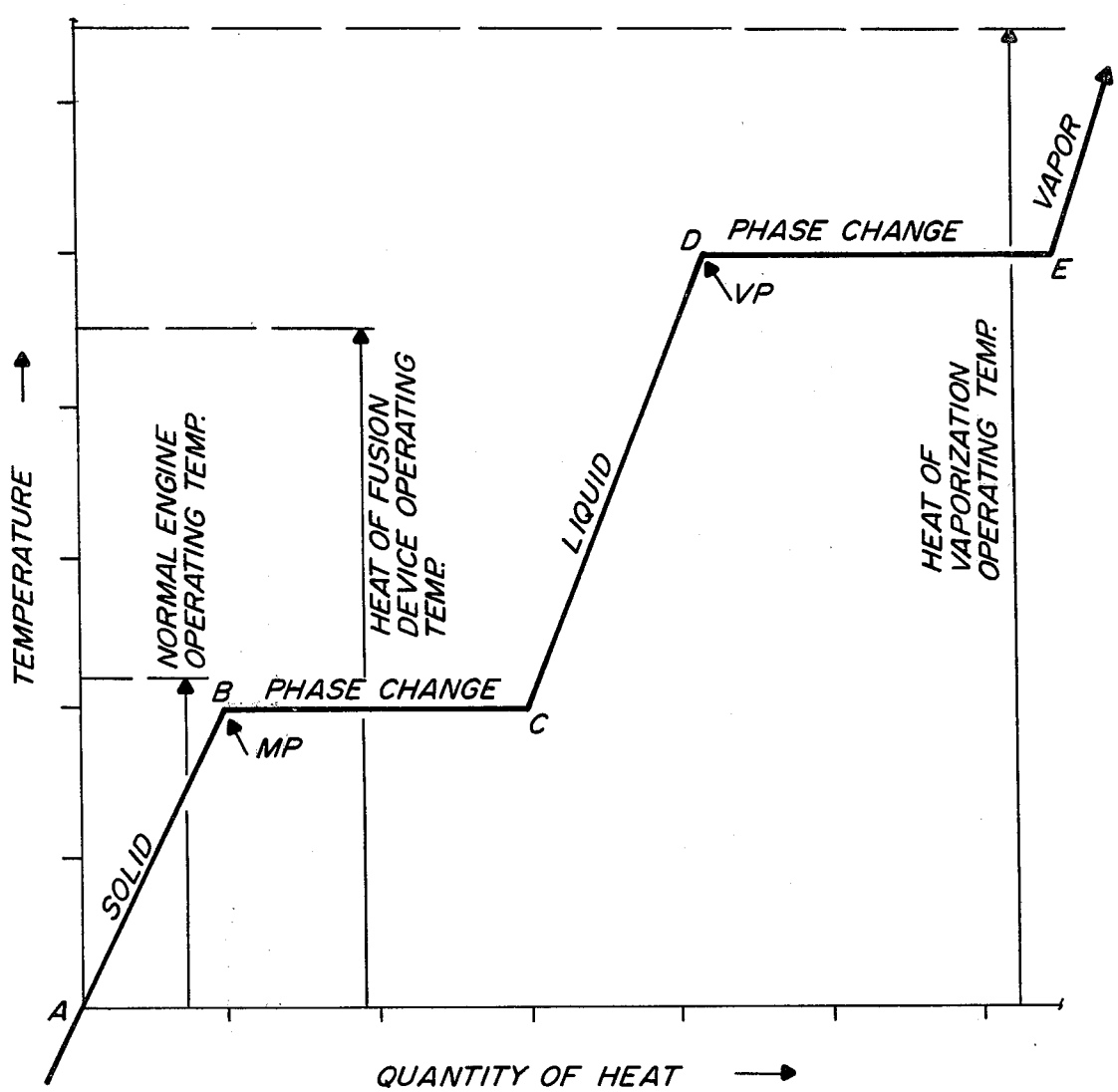
FIG. 1 is a graph, plotting temperature versus heat quantity for a typical change-of-state heat-storage material, and also showing the relative operating temperatures of an internal-combustion engine.

In the method of the present invention, the heat from an internal combustion engine, particularly its intake manifold, is absorbed in a heat-storage medium disposed adjacent to the intake manifold in heat-exchange relationship with it. The waste heat from the intake manifold of an operating engine and from the engine block at engine shut-down (hot soak), which is otherwise unused, is stored in the heat-storage medium. Then, when the engine is shut down and begins to cool, the heat-storage medium releases stored heat energy back to the intake manifold, thereby maintaining it at an increased temperature and improving the engine's overall efficiency. It has also been discovered that even after the "cold start" period, engine efficiency will be improved by increasing and making more uniform the intake manifold operating temperature during normal use, but this improvement is less pronounced than that achieved during cold start.

While any substance with a capacity for holding heat may be used, a preferred type of material for the heat-storage medium is a change-of-state material. The heat energy absorbed during phase change is employed to enhance the temperature-maintaining effect of the invention and to help rapid reheating when restarting the engine. The operating temperature range of the engine imposes limits within which the heat storage material must undergo complete phase change or chemical change in order to achieve maximum heat recovery. In addition to the temperature range limits, the heat-storage material should preferably have a high heat of fusion or exothermic heat of reaction, high specific heat, and also a high heat of vaporization if the medium is chosen to extend into the vapor phase. Table I is a list of compounds which are preferred for use as the heat-storage medium of the invention. The substances in Table I are selected principally for their melting point ranges and their latent heats of transformation.

TABLE I

Melting Points and Heat of Fusion of Some Heat-Storage Materials

| Substance | C.°/F.° Melting Point | Cal/Gm Heat of Fusion |
|---|---|---|
| Paraffins | | |
| Eicosane | 36.4/97.5 | 52 |
| Pentacosane | 53.3/127.9 | 54 |
| Tritiacontane | 71.1/159.9 | 54 |
| Naphthalene | 80./176 | 36 |

TABLE I-continued

Melting Points and Heat of Fusion of Some Heat-Storage Materials

| Substance | C.°/F.° Melting Point | Cal/Gm Heat of Fusion |
|---|---|---|
| Camphene | 51./123.8 | 57 |
| Elaidic Acid | 544./111 | 52 |
| p-Toluidine | 44.5/112 | 40 |
| Phenol | 42./108 | 29 |
| Nickel Nitrate | 57./134 | 36 |
| Phosphoric Acid | 42./108 | 26 |
| Sodium Thiosulfate | 48./119 | 23 |
| Calcium Chloride | 30./86 | 41 |
| Calcium Nitrate | 43./109 | 34 |
| Manganese Nitrate | 36./96 | 28 |
| Phosphorus | 44./112 | 150 |
| Rubidium | 38./100.44 | 520 |
| Magnesium Chloride | 117./243 | 40 |
| Magnesium Nitrate | 90./194 | 38 |
| Glaubers Salt | 32./90 | 57 |
| Sulfur Trioxide | 50./122 | 76 |
| Sodium Phosphate | 35./94 | 67 |
| White Vitriol - (Zinc Sulfate) | 39./102 | |
| Magnesium nitrate hexahydrate | 87./190 | 39 |
| Eutectic mixture of magnesium nitrate hexahydrate and magnesium chloride hexahydrate | 57./135 | 32 |

Normally, an engine will operate in the range between slightly below 100° C. and ambient temperature. During the immediate shut-down or "hot-soak", engine temperatures may elevate to even higher than the boiling point of water.

FIG. 1 shows an idealized relationship between the heat-storage medium and normal engine operational temperatures. There it is seen that some of the heat which was wasted during engine operation and in the immediate shut-down period can be absorbed by the heat-storage medium. The resulting absorption of heat energy will, as illustrated, afford significant increases of heat energy during phase change. This process of heat absorption is reversible and exhibits the same characteristic changes of heat energy when the heat-storage medium is allowed to cool. Therefore, a significant quantity of heat energy which is absorbed during phase change may be returned to the intake manifold upon solidification of the heat-storage medium.

As illustrated in FIG. 1, a change-of-state heat-absorbing material will be a solid when below a particular temperature (indicated along the line between points A and B). Once the temperature reaches the melting point of the material (point B), it changes to a liquid and experiences an increase of heat energy without temperature increase during the melting process (as indicated between points B and C). As the engine temperature rises again, and after all the heat storage material has turned to liquid, the liquid temperature also rises (shown between points C and D). Another marked increase of heat energy occurs at the vapor point, and heat energy continues to be absorbed until the liquid has turned entirely to vapor (illustrated between points D and E). Once all of the liquid has vaporized, the vapor temperature increases with a proportional rise in heat energy as more heat is absorbed by the system. The present invention employs these marked absorptions of heat energy during phase change to store energy which is then given back to the engine when the process is reversed and engine temperature lowers. For example, the heat energy given off upon solidification equals the energy absorbed on melting.

Figure 2:
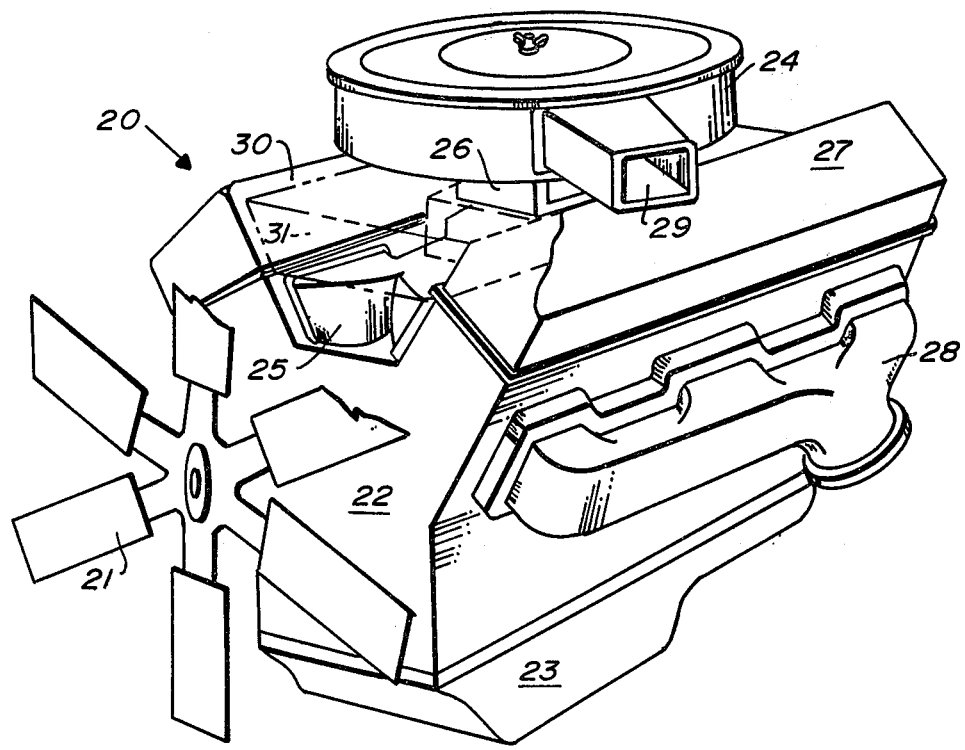
FIG. 2 is a front perspective view of an internal-combustion engine, partially broken away to illustrate a heat-storage reservoir embodying the principles of the invention.

The container-type heat-storage reservoir of FIG. 2

FIG. 2 illustrates a typical internal-combustion engine 20 having a fan 21, an engine block 22, an oil pan 23, an air filter assembly 24, an intake manifold 25, a carburetor 26, valve covers 27, and an exhaust manifold 28. The air filter assembly 24 has an intake port 29. The engine has a heat-storage reservoir 30 disposed below the air filter assembly 24, surrounding the carburetor 26 and on top of the intake manifold 25, in direct heat-exchange relationship with it. The heat-storage reservoir 30 occupies otherwise unused engine space and does not interfere with the normal engine operation. The reservoir 30 is filled with a heat-storage medium 31 which may be water or, preferably, one of the change-of-state heat-storage materials of Table I.

Engine heat is transferred from the intake manifold 25, the engine block 22, and the valve covers 27, to the reservoir 30, where it is stored in the heat-storage medium 31, which eventually melts. After engine shutdown, as the engine 20 cools to temperatures below that of the melted heat-storage medium 31, the system tends to equilibrate by the transfer of heat from the storage medium 31 back to the intake manifold 25 and carburetor 26, keeping them warm as the medium 31 solidifies.

Figure 3:
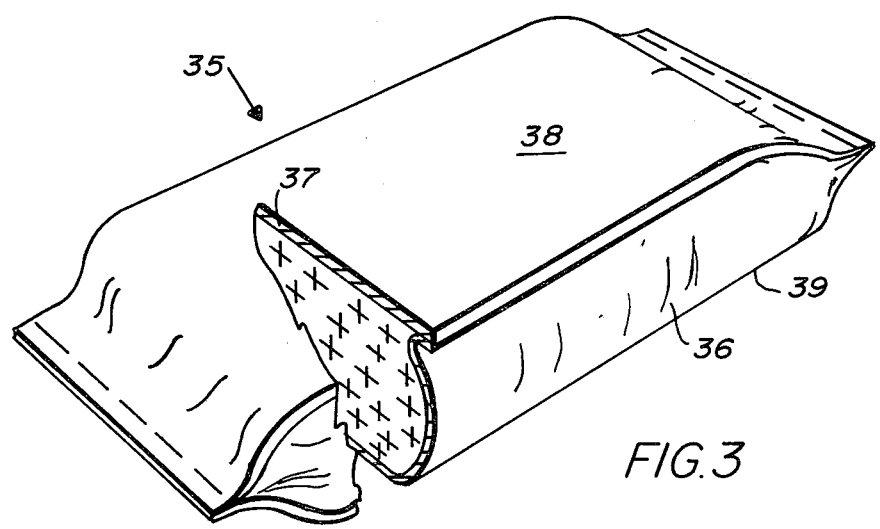
FIG. 3 is a top perspective view of a heat-storage bag embodying the principles of the invention, partially broken away to illustrate internal construction.

The heat-storage bags of FIG. 3

Figure 4:
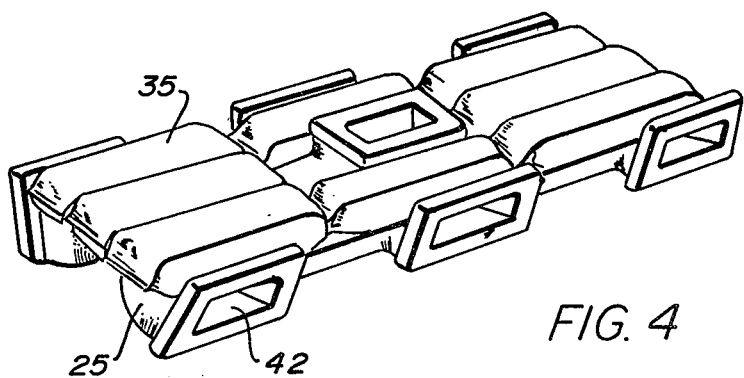
FIG. 4 is a perspective view of a typical intake manifold, showing the heat-storage bags of the invention installed for operation.

FIG. 3 shows a heat-storage bag 35 of the invention. The bag 35 is filled with a heat-storage material 31, preferably a change-of-state material such as those shown in Table I. A flexible casing 36 is employed, and the top of the bag 35 has an insulating cover 37 with an aluminized reflective surface 38. The bottom 39 of the bag is adapted for heat exchange. The heat-storage bag of the invention may be placed atop the intake manifold 25 of an internal combustion engine as illustrated in FIG. 4. In that manner, direct heat exchange between the heat-storage bag 35 and the intake manifold 25 may be achieved. A single form-fit heat-storage bag may be used, or a plurality of smaller heat-storage bags may be placed together atop the intake manifold 25. Heat storage and release is accomplished by the same mechanism as in the embodiment of FIG. 2.

Figure 5:
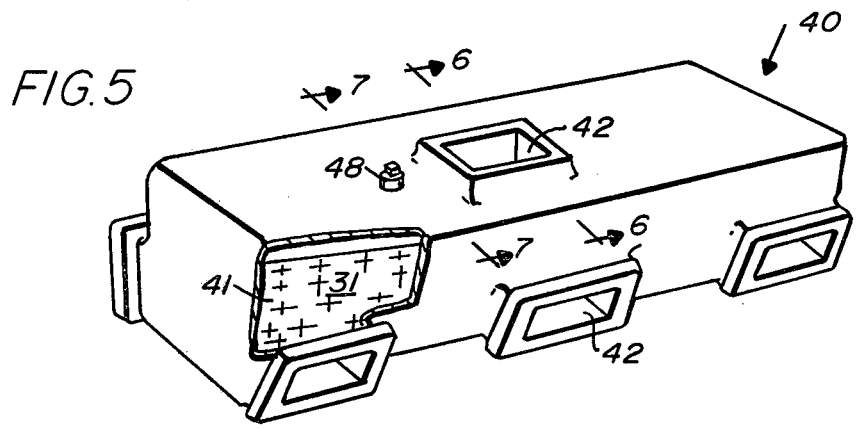
FIG. 5 is a perspective view of a modified heat-storage intake manifold of the invention, partially broken away to illustrate the heat storage medium in the unitary chamber.
Figure 6:
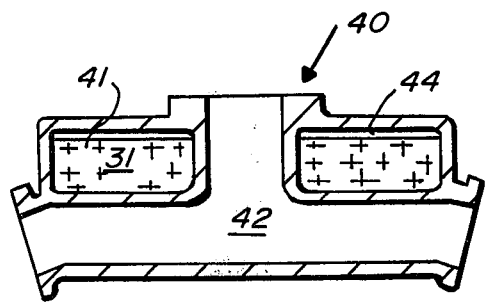
FIG. 6 is a view in vertical section of the modified heat-storage intake manifold of the invention, taken along the line 6—6 in FIG. 5.
Figure 7:
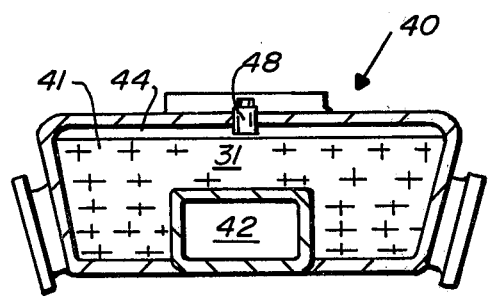
FIG. 7 is a view in section of the modified heat-storage intake manifold of the invention, taken along line 7—7 in FIG. 5, illustrating the manner in which the heat-storage chamber surrounds the operating portion of the manifold.

The modified intake manifold of FIGS. 5–7

Alternatively, as illustrated in FIG. 5, the internal-combustion engine 20 may be provided with an intake manifold 40 which is unitary with surrounding chambers 41 holding a heat-storage medium 31. As shown in FIGS. 6 and 7, the unitary reservoir 41 surround the manifold passages 42 through which the fuel-air mixture travels, thereby giving the greatest possible area of surface contact for direct heat exchange with the intake manifold 40. The reservoirs 41 are preferably filled with a change-of-state heat-storage material, which absorbs heat directly from the manifold 40 and transfers it directly back to the manifold as the engine 20 cools. A fill plug 48 is provided for adding heat-storage material to the chambers 41. It is preferred to leave a space 44 for expansion of the heat-storage material.

Figure 8:
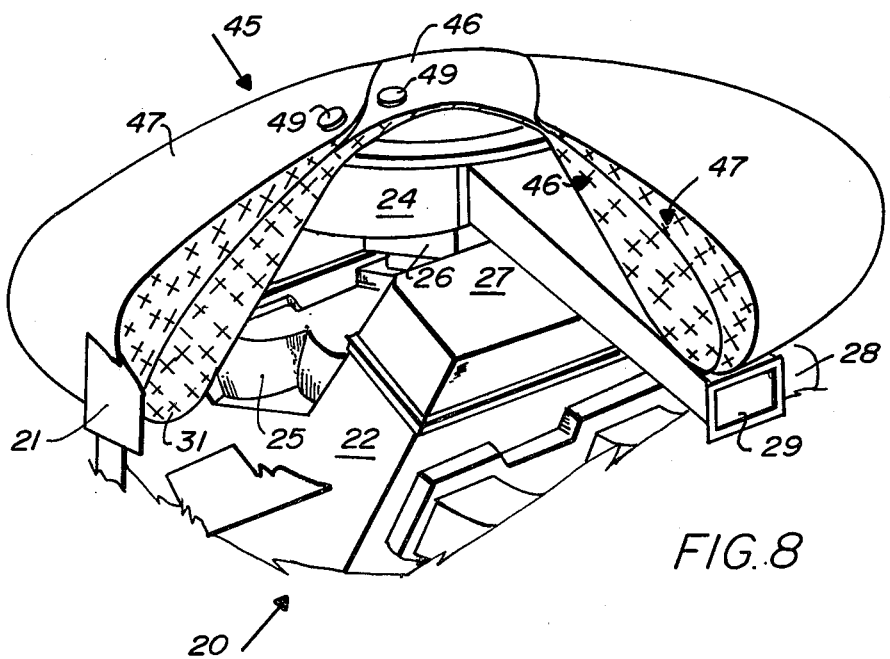
FIG. 8 is a front perspective view of an internal-combustion engine with a portion of the fan removed, illustrating a bladder-type, dual compartment heat-storage reservoir of the invention, which is shown partially broken away to illustrate internal construction.

The dual chamber bladder of FIG. 8

As illustrated in FIG. 8 a bladder-type reservoir 45 may be employed for holding heat-storage material. The bladder 45 has a lower chamber 46 and an upper chamber 47. The lower chamber 46 is adapted to fit over the top of the engine 20, covering all but the intake port 29 of the air filter assembly 24 and extending over the sides of the valve covers 27. The intake manifold 25 is also covered, as shown at the front of the engine 26. A change-of-state heat-storage material 31 is disposed in the lower chamber 46. The upper chamber 47 may be filled with water or with an additional change-of-state heat-storage medium 31'. The upper chamber 47 extends over the lower chamber 46 and is, preferably, substantially even with its perimeter, acting as an insulating cover and as an additional heat storage unit. Each chamber 46, 47 is provided with a fill cap 49 for adding heat storage materials 31.

Care should be taken that the opening to the air inlet port 29 for the air filter assembly 24 is not blocked or covered over.

The bladder 45 must be made of material which is resistant to temperatures greater than those which an engine 20 may be expected to reach. The bladder 45 may be made of a flexible hose-like material or of an inflexible plastic. It may have a point of attachment to the wing nut atop the filter 24 above the engine 20 and may be placed over the top of the engine 28, so that the reservoir 45 radiates heat down to the engine 20 as it cools.

Figure 9:
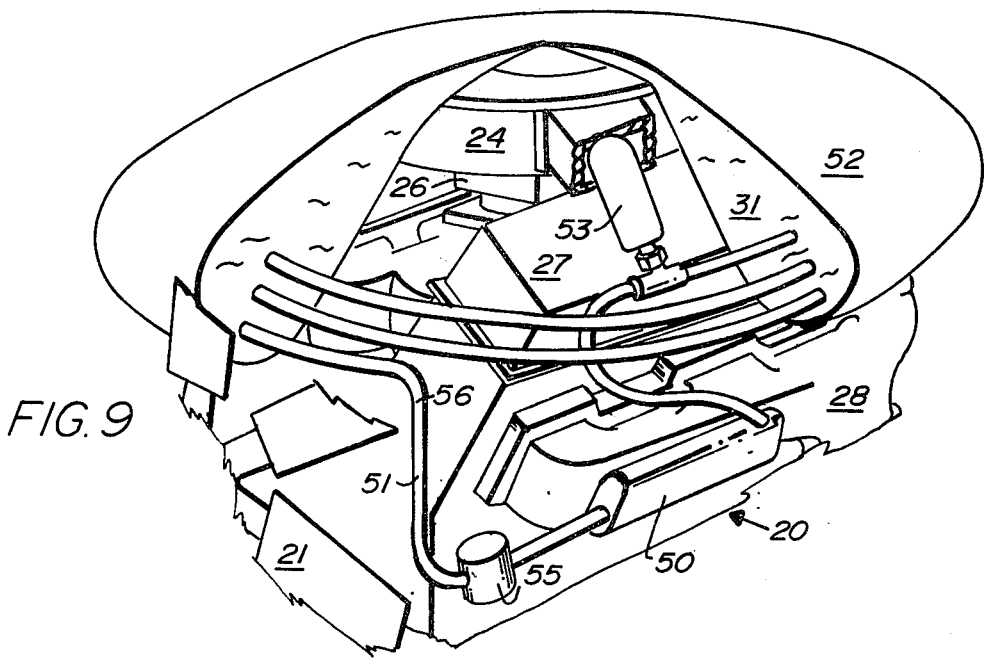
FIG. 9 is a front perspective view of an internal-combustion engine with part of the fan removed, illustrating a bladder-type heat-storage reservoir with an exhaust manifold heating coil disposed in the bladder; the bladder is partially broken away to illustrate internal construction.
Figure 10:
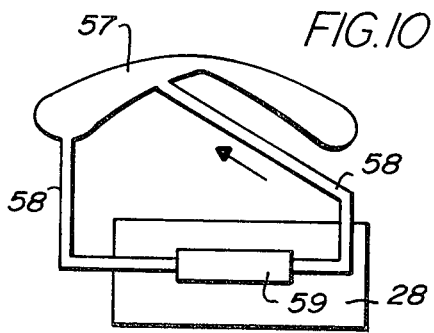
FIG. 10 is a diagrammatic illustration of a bladder-type heat-storage reservoir having heat-storage material in direct communication with an exhaust manifold heat-exchanger.

The exhaust manifold heat exchanger embodiment of FIGS. 9 and 10

As illustrated in FIG. 9, a heat exchanger 50 may be placed on the exhaust manifold 28 of an engine. The heat exchanger 50 is connected to a heat coil 51 which passes through a bladder-type heat-storage reservoir 52, preferably around its perimeter. The reservoir 52 is fitted with a heat-storage medium 31, such as water or preferably a change-of-state material. An expansion chamber 53 and a thermostat/control valve 55 are connected to the heat coil 51. The heat coil is filled with a second heat-storage medium 56, preferably a change-of-state material which extends into the vapor phase at normal exhaust manifold 28 operating temperatures. The second medium 56 transfers extra heat to the heat-storage material 31 in the bladder 52, besides that which it absorbs from the engine 20. The bladder 52 could be replaced by a heat-storage reservoir 30 such as that of the embodiment shown in FIG. 2.

The elevated operating temperature of the exhaust manifold 28 is transferred through the heat exchanger 50 to the second heat-storage material 56, causing it to vaporize. The vapor rises through the heat coil 51 when the valve 55 is open, through the reservoir 52 or 30 to transfer heat to the heat storage material 31, after which the second heat-storage material 56 condenses and returns by gravity feed to the heat exchanger 50 to repeat the cycle. The expansion chamber 53 absorbs the increased pressure of the second heat-storage material when it turns to vapor. The heat stored in the reservoir 52 is transferred to the intake manifold 25 and the carburetor 26 as the engine cools after operation.

FIG. 10 diagrammatically illustrates another embodiment of the invention, in which exhaust manifold heat is conserved in a bladder-type heat-storage reservoir 57. A conduit 58 connects the heat storage material 31 inside the reservoir 57 to a heat exchanger 59 on the exhaust manifold. The conduit 58 is disposed to withdraw heat-storage material from the periphery of the reservoir 57, and transfer it to the heat exchanger 59, where it absorbs heat from the exhaust manifold and becomes either extremely hot liquid or vapor, depending on the type of material used, and finally returns the heated material to the reservoir near its center. In this manner, both gravity and convention work to circulate the material 31.

Figure 11:
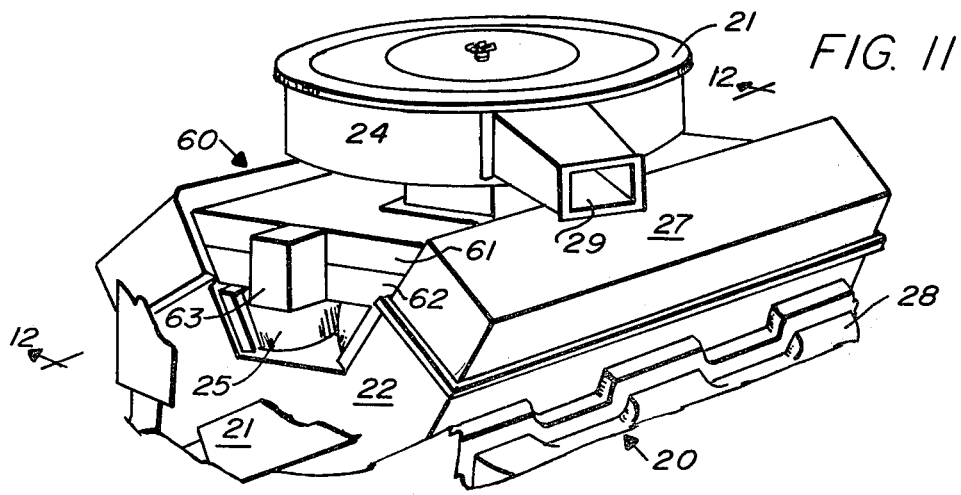
FIG. 11 is a front perspective view of an internal-combustion engine embodying the principles of the invention, shown with a dual compartment heat-storage reservoir for exothermic reaction.
Figure 12:
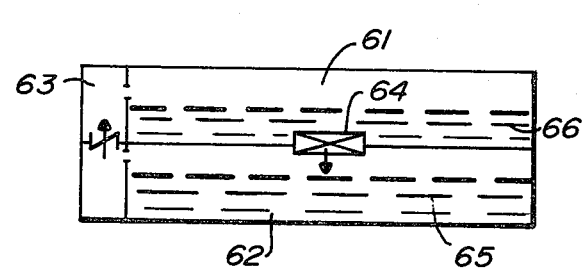
FIG. 12 is a diagrammatic illustration of a dual compartment exothermic reaction heat-storage reservoir embodying the principles of the invention, shown in cross section along line 12—12 in FIG. 11.

The exothermic reaction reservoir of FIGS. 11 and 12

As illustrated in FIGS. 11 and 12, a reservoir 60 may be installed around the carburetor 26, between the air filter assembly 24 and the intake manifold 25 of an internal-combustion engine 20. The reservoir 60 has an upper chamber 61 and a lower chamber 62, which are connected at the front by a check valve 63 permitting only upward flow, and in the middle by a controllable valve 64.

During assembly the lower chamber 62 is first partially filled with a first substance 65, such as aluminum nitrate, which is then saturated with a second substance 66, such as water (as water of crystallization), which reacts exothermically when mixed with the first substance 65, until an optimum ratio between the two substances is reached. Preferred materials for the first and second reversable exothermically-reacting substances 65 and 66 are described in Table II, along with their corresponding heats of reaction and reaction temperatures.

TABLE II

Reversable Exothermic Reacting Substances with Water of Crystallization

| Substance | Formula | Exothermic Heat of Reaction gm cal/gm | Reaction Temp |
|---|---|---|---|
| Aluminum nitrate | $Al(NO_3)_3.9H_2O$ | −897.34 | 73.° C. |
| Aluminum sulfate | $Al_2(SO_4)_3.18H_2O$ | −2118.5 | 86.5° C. |
| Bromine hydrate | $Br_2.10H_2O$ | −700. | 6.8° C. |
| Calcium Nitrate | $Ca(NO_3)_2.4H_2O$ | −509.37 | 42.7° C. |
| Ferric nitrate | $Fe(NO_3)_2.6H_2O$ | −784.4 | 60.5° C. |
| Ferrous Sulfate (copperas) | $FeSO_4.7H_2O$ | −718.7 | 64.° C. |
| Lithium bromide | $LiBr.3H_2O$ | −301.9 | 44.° C. |
| Lithium iodide | $LiI.3H_2O$ | −285.02 | 73.° C. |
| Magnesium nitrate | $Mg(NO_3)_2.6H_2O$ | −624.36 | 95.° C. |
| Magnesium sulfate | $MgSO_4.7H_2O$ | −808.7 | 70.° C. |
| Potassium fluoride | $KF.2H_2O$ | −277.0 | 41.° C. |
| Sodium tetra borate | $NaB_4O_7.10H_2O$ | −1497.2 | 75.° C. |
| Sodium sulfide | $Na_2S.9H_2O$ | −736.7 | 50.° C. |

When the engine 20 is for the first time started and reaches operating temperature, the saturated first substance 65 (i.e. already saturated with the second substance 66) is heated to the point where the second substance 66 (e.g. water) is driven from it as a vapor that migrates to the upper chamber 61 by way of the check valve 63. The second substance 66 is retained in the upper chamber 61 until the next time when the engine 20 is started. As the engine cools between uses, the second substance 66 liquifies; so it is ready to be mixed again with the first substance 65. The controllable valve 64 is opened upon engine start, and the two substances mix, react, and give off heat which warms the carburetor 26 and the intake manifold 25 to improve engine efficiency, even though the engine may have cooled down between uses. The vaporization and separation steps are then repeated as the engine comes up to operating temperature, so the system is ready for the next use.

Alternatively, a control (not shown) may be provided for selectively opening said controllable valve 64 by a very small amount, for automatically introducing a small flow of said second substance 66 into said first substance 65 and thereby generating heat to keep the engine warm between relatively closely timed uses. In this embodiment, the valve 64 automatically opens fully upon engine start-up, resetting the control and the controllable valve 64 for normal operation.

The preferred embodiments described herein are intended to be purely illustrative, and not limiting of the scope of the invention. For example, although the drawings illustrate a V-type engine, the present invention is applicable to any form of internal combustion engine such as a rotary engine, a fuel-injected engine, or an engine having no top air filter assembly. Other embodiments and variations will be apparent to those skilled in the art and may be made without departing from the essence and scope of the invention as defined in the following claims.

I claim:

1. A method of improving combustion and ignition upon cold start of an internal-combustion engine having an intake manifold, the method comprising:
    storing engine heat in a change-of-state heat-absorbing substance disposed in heat-exchange relationship with the intake manifold while the engine is running, and
    maintaining an increased intake manifold temperature by gradually releasing heat from the change-of-state heat-absorbing substance to the inake manifold, as the manifold cools when the engine is at rest.

2. A method of improving fuel efficiency and decreasing exhaust emissions upon cold start of an internal-combustion engine having an intake manifold, a dual-chambered reservoir disposed on top of the manifold, and a first reversably-exothermically reactive substance in a lower chamber of said reservoir, the method comprising:
    introducing a second, corresponding, reversably-exothermically reactive substance from an upper chamber of said reservoir to the lower chamber of said reservoir,
    reacting said first substance with said second substance, thereby generating heat,
    transferring said generated heat to said intake manifold,
    starting said engine and running it until it reaches substantially operating temperature, thereby vaporizing said second substance, and
    transferring said vaporized second substance back to said upper chamber, to condense upon cooling of said second substance and to ready for re-mixing with said first substance upon restarting of said engine.

3. The method of claim 2 further comprising the step of continuously introducing a small amount of said second substance to the lower chamber of said reservoir when said engine is at rest, thereby reacting a small amount of said second substance with said first substance to generate heat and keep said engine warm for an extended period of time.

4. Apparatus for improving combustion and ignition upon cold start of an internal-combustion engine, comprising:
    change-of-state heat storage means disposed in heat-exchange relationship with the engine for absorbing engine heat from engine operation and hot soak following engine operation, and for maintaining increased engine temperature by gradually releasing stored heat back to the engine when the engine is at rest.

5. An improved internal-combustion engine having an intake manifold, and an exhaust manifold wherein the improvement comprises:
- a heat-storage reservoir in heat-exchange relationship with said intake manifold, and
- a heat-storage medium disposed in said heat-storage reservoir,
- whereby engine heat from operation of said engine is transferred from said intake manifold to said heat-storage medium, and whereby stored heat is transferred directly from said heat-storage medium to said intake manifold upon the cooling of said engine after shut-down, thereby maintaining an elevated intake manifold temperature for start-up.

6. The improved internal-combustion engine of claim 5 wherein said heat-storage medium is a change-of-state material having a melting point temperature which is less than the normal cycle temperature of said engine.

7. The improved internal combustion engine of claim 5 or 6 further comprising:
- a heat exchanger disposed in heat-exchange relationship with said exhaust manifold, and
- a heating coil passing from said heat exchanger through said heat-storage medium and then back to said heat exchanger.

8. The improved internal combustion engine of claim 7 having:
- an expansion chamber disposed along said heating coil outside said heat-storage reservoir,
- a control valve disposed along said heating coil outside said heat-storage reservoir,
- a thermostat disposed along said heating coil outside said heat storage reservoir, and
- a second heat-storage medium disposed inside said heating coil.

9. The improved internal-combustion engine of claim 8 wherein said second heat-storage medium is a change-of-state material having a melting point temperature which is less than the normal exhaust cycle temperature of said engine.

10. The improved internal-combustion engine of claim 5 wherein said reservoir comprises a bladder fitted over the top of said engine, said bladder extending at least over the outside of said intake manifold.

11. The improved internal-combustion engine of claim 5 wherein said reservoir comprises a chamber disposed below said air filter assembly, on top of and in heat-exchange relationship with said intake manifold.

12. The improved internal-combustion engine of claim 5 further comprising:
- a heat-exchanger disposed in heat-exchange relationship with said exhaust manifold, and
- a heat storage material conduit for transferring heat storage material from said reservoir to said heat exchanger and back to said reservoir.

13. The improved internal-combustion engine of claim 5 wherein said reservoir comprises a bladder of heat-conductive material adapted to fit over the top of said engine, said bladder having:
- a lower chamber extending at least over the outside of said intake manifold, said heat-storage medium being disposed in said lower chamber,
- an upper chamber in said bladder covering said lower chamber, and
- a second heat-storage medium in said upper chamber.

14. The improved internal-combustion engine of claim 13 wherein said first heat-storage medium is a change-of-state material having a melting point temperature which is less than the normal cycle temperature of said engine.

15. The improved internal-combustion engine of claims 13 or 14 wherein said second heat-storage medium is water.

16. The improved internal-combustion engine of claims 13 or 14 wherein said second heat-storage medium is a change-of-state material having a melting point temperature which is less than the normal cycle temperature of said engine.

17. The improved internal-combustion engine of claim 5 wherein said heat-storage reservoir comprises a plurality of heat-storage bags placed on top of said intake manifold, said bags comprising:
- a flexible casing,
- an insulating cover at the top of each said bag,
- a reflective top surface over said insulating cover, and
- a heat-conductive bottom surface on each said bag for heat exchange with said intake manifold.

18. The improved internal-combustion engine of claim 5 wherein said heat-storage reservoir comprises a cast chamber unitary with said intake manifold, substantially surrounding its functional passages.

19. The improved internal-combustion engine of claim 5 wherein said heat-storage reservoir comprises a container in heat-exchange relationship with said intake manifold, said container further comprising:
- a first chamber,
- a second chamber,
- a check valve connecting said first chamber with said second chamber, said check valve permitting fluid flow only from said second chamber to said first chamber, and
- a controllable recycling valve for selectively permitting fluid flow from said first chamber to said second chamber, said recycling valve connecting said first chamber and said second chamber,
- said heat-storage medium comprising a first substance disposed in said second chamber, said first substance being associated with a second substance, which second substance reversably exothermically reacts when mixed with said first substance,
- whereby, as said engine warms to normal operating temperature and surpasses the heat of reaction between said first substance and said second substance, said reaction ceases and said second substance separates as a gas from said first substance and passes through said check valve to said first chamber and,
- whereby said controllable recycling valve is opened upon engine start-up, permitting said second substance to mix again with said first substance and thereby generate heat which rapidly warms said intake manifold when additional manifold temperature is needed.

20. The improved internal-combustion engine of claim 19 further comprising:
- selectable control means for partially opening said controllable recycling valve to permit a continuous small flow of said second substance from said first chamber into said second chamber, to mix with said first substance and thereby generate heat to keep said engine warm between uses.

21. In an internal-combustion engine having an intake manifold and an air filter assembly, a heat-storage reservoir for maintaining elevated temperature in said intake manifold after said engine has been shut down, comprising:
- a bladder adapted to fit in heat-exchange relationship ovr the top of a said engine, said bladder having
  - a lower chamber extending substantially over said intake manifold, and
  - an upper chamber covering said lower chamber,
- a first heat-storage material in said lower chamber, and
- a second heat-storage material in said upper chamber.

22. The heat-storage reservoir of claim 21 wherein said first heat-storage material has a melting point temperature which is lower than the normal cycle temperature of said engine.

23. The heat storage reservoir of claim 21 wherein said second heat storage material is water.

24. In an internal-combustion engine having an upwardly exposed intake manifold surface, a plurality of heat-storage bags for placement on top of said intake manifold surface, said heat storage bags each comprising:
- a flexible casing,
- an insulating cover at the top of each said bag,
- a reflective top surface over said insulating cover,
- a heat conductive bottom surface for heat exchange with said intake manifold, and
- a change-of-state heat-storage material in said flexible casing.

25. An improved intake manifold for an internal-combustion engine having cast, unitary chambers surrounding the functional passageways of said manifold, said chambers being filled with a change-of-state heat-storage material for absorbing and storing heat from operation to said engine by direct heat exchange, and maintaining elevated manifold temperatures when said engine begins to cool down from normal cycle temperature.

26. In an internal-combustion engine having an intake manifold and a top air filter assembly, a heat-storage container for storing heat generated by said engine when running and for releasing stored heat to said intake manifold after said engine has been shut down, comprising:
- a container disposed below said air filter assembly, and in heat exchange relationship with said intake manifold, and
- a change-of-state heat-storage material disposed in said container.

27. The heat-storage container of claim 26 having:
- an upper chamber,
- a lower chamber,
- a check valve connecting said upper chamber with said lower chamber, said check valve permitting fluid flow from said lower chamber to said upper chamber,
- a controllable recycling valve for selectively permitting fluid flow from said upper chamber to said lower chamber, said recycling valve connecting said upper chamber and said lower chamber, and
- a first substance disposed in said lower chamber, said first substance being associated with a second substance which reversably exothermically reacts when mixed with said first substance,
- whereby as said engine warms to normal operating temperature and surpasses the heat of reaction of said first substance and said second substance, said reaction ceases and said second substance separates as a vapor from said first substance and passes through said check valve to said upper chamber where it cools and condenses upon the cooling of said engine below the boiling point of said second substance, and
- whereby said controllable recycling valve is opened upon engine start-up, permitting said cooled second substance to flow into said lower chamber and mix with said first substance, thereby generating heat which rapidly warms said intake manifold.

28. The heat storage container of claim 27 further comprising:
- selectable means for partially opening said controllable recycling valve to cause a slow flow of said cooled second substance into said lower chamber to mix with said first substance, thereby generating heat which keeps said engine warm for an extended period of time between uses.

29. In an internal-combustion engine having an intake manifold, an air filter assembly and an exhaust manifold, a heat-storage reservoir for maintaining elevated temperature in said intake manifold after said engine has been shut down, comprising:
- a bladder adapted to fit over the top of said engine, said bladder extending generally over said intake manifold, and
- a first heat-storage medium in said bladder, whereby said heat-storage medium absorbs heat from said intake manifold while said engine is hot, and transfers heat back to said intake manifold upon cooling of said engine.

30. The heat-storage reservoir of claim 29 further comprising:
- a heating coil disposed inside said bladder around its perimeter, in heat-exchange relationship with said heat-storage medium,
- a second heat-storage medium in said coil,
- a heat exchanger in heat-exchange relationship with said exhaust manifold, said heating coil passing from said bladder to said heat exchanger,
- an expansion chamber attached to said heat coil outside said bladder, and
- a thermostat/valve attached to said heating coil outside said bladder,
- whereby the heat of said exhaust manifold is absorbed by said second heat-storage medium in said heat exchanger and is transferred to said first heat-storage medium inside said bladder, which in turn releases stored heat to said intake manifold keeping said manifold warm during cooling of said engine.

31. The heat-storage reservoir of claim 30 wherein said second heat-storage medium is a change-of-state material having a melting point temperature lower than the normal exhaust cycle temperature of said engine.

32. The heat-storage reservoir of claim 29, 30 or 31 wherein said first heat-storage medium is water.

33. The heat-storage reservoir of claim 32 wherein said second heat-storage medium is a change-of-state material having a vaporization point temperature lower than the normal cycle temperature of said exhaust manifold, and a melting point above normal ambient temperature.

34. The heat storage reservoir of claim 30, 31, or 33 wherein said first heat-storage medium is a change-of-state material having a melting point temperature lower than the normal cycle temperature of said engine.

35. An improved internal-combustion engine having an intake manifold with an air-intake cleaner, and an exhaust manifold wherein the improvement comprises:

a heat-storage reservoir shaped to conform to the shape of said air-intake cleaner and normally in heat-exchange relationship with said air-intake cleaner, while readily removable therefrom, and a heat-storage medium disposed in said heat-storage reservoir, whereby engine heat from operation of said engine is transferred from said intake manifold via said air-intake cleaner to said heat-storage medium.

36. The improved internal-combustion engine of claim 35 wherein said reservoir comprises a shaped ladder fitted over the top of said air-intake cleaner.

37. The improved internal-combustion engine of claim 35 wherein said reservoir comprises a shaped badder of heat-conductive material adapted to fit over the top of said air-intake cleaner, said bladder having:

a lower chamber extending generally over the outside of said air-intake cleaner, said heat-storage medium being disposed in said lower chamber, an upper chamber in said bladder covering said lower chamber, and a second heat-storage medium in said upper chamber.

38. The improved internal-combustion engine of claim 35 wherein said heat-storage reservoir comprises a plurality of heat-storage bags placed on top of said air-intake cleaner, said bags comprising:

a flexible casing, an insulating cover at the top of each said bag, a reflective top surface over said insulating cover, and a heat-conductive bottom surface on each said bag for heat exchange with said air-intake cleaner.

39. In an internal-combustion engine having an intake manifold and an air filter assembly, a removable heat-storage reservoir able to maintain elevated temperature in said intake manifold after said engine has been shut down, comprising:

a shaped bladder adapted to fit removably in heat-exchange relationship over the top of a said engine.

40. The engine of claim 39 wherein said bladder has a lower chamber extending substantially over a portion of said intake manifold, and an upper chamber covering said lower chamber, a first heat-storage material in said lower chamber, and a second heat-storage material in said upper chamber.

* * * * *